(12) United States Patent
Dauzet (10) Patent No.: US 8,947,221 B2
(45) Date of Patent: Feb. 3, 2015

(54) METHOD AND APPARATUS FOR TRACKING DEVICE CONNECTION AND STATE CHANGE

(71) Applicant: Ford Global Technologies, LLC, Dearborn, MI (US)

(72) Inventor: Ryan Robert Dauzet, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 13/777,417

(22) Filed: Feb. 26, 2013

(65) Prior Publication Data
US 2014/0240112 A1    Aug. 28, 2014

(51) Int. Cl.
*B60Q 1/00* (2006.01)
*B60R 25/102* (2013.01)

(52) U.S. Cl.
CPC .................................. *B60R 25/102* (2013.01)
USPC ........ 340/438; 340/5.74; 340/425.5; 340/687

(58) Field of Classification Search
USPC ............. 340/5.2, 5.72, 5.74, 425.5, 438, 457, 340/687
See application file for complete search history.

(56) References Cited

U.S. PATENT DOCUMENTS

| | | |
|---|---|---|
| 4,543,569 A | 9/1985 | Karlstrom |
| 5,081,667 A | 1/1992 | Drori et al. |
| 5,467,070 A | 11/1995 | Drori et al. |
| 5,513,107 A | 4/1996 | Gormley |
| 5,627,510 A | 5/1997 | Yuan |
| 5,635,916 A | 6/1997 | Bucholtz et al. |
| 5,655,081 A | 8/1997 | Bonnell et al. |
| 5,734,336 A | 3/1998 | Smithline |
| 5,776,031 A | 7/1998 | Minowa et al. |
| 5,828,319 A | 10/1998 | Tonkin et al. |
| 5,874,889 A | 2/1999 | Higdon et al. |
| 5,959,540 A | 9/1999 | Walter |
| 6,018,291 A | 1/2000 | Marble et al. |
| 6,133,825 A | 10/2000 | Matsuoka |
| 6,177,866 B1 | 1/2001 | O'Connell |
| 6,198,996 B1 | 3/2001 | Berstis |

(Continued)

FOREIGN PATENT DOCUMENTS

| | | |
|---|---|---|
| CN | 1863052 | 11/2006 |
| CN | 101596895 | 12/2009 |

(Continued)

OTHER PUBLICATIONS

Autobiometrics, COM, US Distributor for ATRD Biometric Immobilizer, http://www.autobiometrics.com, Jul. 6, 2011.

(Continued)

*Primary Examiner* — Brent Swarthout
(74) *Attorney, Agent, or Firm* — Jennifer M. Stec; Brooks Kushman P.C.

(57) ABSTRACT

A system includes a processor configured to determine if a vehicle computing system (VCS) has been placed in a monitoring mode. The processor is also configured to detect and log the connection or disconnection of any remote devices. The processor is further configured to flag logs if the VCS is in a monitoring mode. Also, the processor is configured to detect the presence of a known vehicle driver or the termination of the monitoring mode and report any flagged logs upon known driver detection or monitoring mode termination.

17 Claims, 3 Drawing Sheets

(56) References Cited

U.S. PATENT DOCUMENTS

| | | |
|---|---|---|
| 6,263,282 B1 | 7/2001 | Vallancourt |
| 6,268,804 B1 | 7/2001 | Janky et al. |
| 6,271,745 B1 | 8/2001 | Anzai et al. |
| 6,282,226 B1 | 8/2001 | Furukawa |
| 6,434,455 B1 | 8/2002 | Snow et al. |
| 6,434,486 B1 | 8/2002 | Studt et al. |
| 6,438,491 B1 | 8/2002 | Farmer |
| 6,539,078 B1 | 3/2003 | Hunt et al. |
| 6,574,734 B1 | 6/2003 | Colson et al. |
| 6,590,495 B1 | 7/2003 | Behbehani |
| 6,668,221 B2 | 12/2003 | Harter, Jr. et al. |
| 6,679,702 B1 | 1/2004 | Rau |
| 6,690,260 B1 | 2/2004 | Ashihara |
| 6,737,963 B2 | 5/2004 | Gutta et al. |
| 6,754,562 B2 | 6/2004 | Strege et al. |
| 6,785,542 B1 | 8/2004 | Blight et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 6,941,194 B1 | 9/2005 | Dauner et al. |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 * | 12/2006 | Aoyama et al. ............ 340/425.5 |
| 7,161,563 B2 | 1/2007 | Vitale et al. |
| 7,173,903 B2 | 2/2007 | Remboski et al. |
| 7,194,069 B1 | 3/2007 | Jones et al. |
| 7,207,041 B2 | 4/2007 | Elson et al. |
| 7,228,213 B2 | 6/2007 | Sakai et al. |
| 7,246,062 B2 | 7/2007 | Knott et al. |
| 7,266,438 B2 | 9/2007 | Kellum et al. |
| 7,337,113 B2 | 2/2008 | Nakagawa et al. |
| 7,340,332 B2 | 3/2008 | Underdahl et al. |
| 7,356,394 B2 | 4/2008 | Burgess |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,484,008 B1 | 1/2009 | Gelvin et al. |
| 7,565,230 B2 | 7/2009 | Gardner et al. |
| 7,602,782 B2 | 10/2009 | Doviak et al. |
| 7,783,475 B2 | 8/2010 | Neuberger et al. |
| 7,812,712 B2 | 10/2010 | White et al. |
| 7,826,945 B2 | 11/2010 | Zhang et al. |
| 8,050,817 B2 | 11/2011 | Moinzadeh |
| 8,050,863 B2 | 11/2011 | Trepagnier et al. |
| 8,089,339 B2 | 1/2012 | Mikan et al. |
| 8,232,864 B2 | 7/2012 | Kakiwaki |
| 8,237,554 B2 | 8/2012 | Miller et al. |
| 8,258,939 B2 | 9/2012 | Miller et al. |
| 8,301,108 B2 | 10/2012 | Naboulsi |
| 8,305,189 B2 | 11/2012 | Miller et al. |
| 8,311,722 B2 | 11/2012 | Zhang et al. |
| 2001/0021891 A1 | 9/2001 | Kusafuka et al. |
| 2002/0013650 A1 | 1/2002 | Kusafuka et al. |
| 2002/0031228 A1 | 3/2002 | Karkas et al. |
| 2002/0096572 A1 | 7/2002 | Chene et al. |
| 2002/0097145 A1 | 7/2002 | Tumey et al. |
| 2003/0004730 A1 | 1/2003 | Yuschik |
| 2003/0055643 A1 | 3/2003 | Woestemeyer et al. |
| 2003/0079123 A1 | 4/2003 | Mas Ribes |
| 2003/0217148 A1 | 11/2003 | Mullen et al. |
| 2003/0220725 A1 | 11/2003 | Harter, Jr. et al. |
| 2003/0231550 A1 | 12/2003 | MacFarlane |
| 2004/0046452 A1 | 3/2004 | Suyama et al. |
| 2004/0073367 A1 | 4/2004 | Altan et al. |
| 2004/0088205 A1 | 5/2004 | Geisler et al. |
| 2004/0124968 A1 | 7/2004 | Inada et al. |
| 2004/0135669 A1 * | 7/2004 | Muench-Casanova ........ 340/5.6 |
| 2004/0135670 A1 * | 7/2004 | Guba ............................ 340/5.21 |
| 2004/0176906 A1 | 9/2004 | Matsubara et al. |
| 2004/0227642 A1 | 11/2004 | Giles et al. |
| 2004/0236475 A1 | 11/2004 | Chowdhary |
| 2005/0021597 A1 | 1/2005 | Derasmo et al. |
| 2005/0033517 A1 | 2/2005 | Kondoh et al. |
| 2005/0125110 A1 | 6/2005 | Potter et al. |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama et al. |
| 2005/0193212 A1 | 9/2005 | Yuhara |
| 2005/0261816 A1 | 11/2005 | DiCroce et al. |
| 2006/0056663 A1 | 3/2006 | Call |
| 2006/0142917 A1 | 6/2006 | Goudy |
| 2006/0150197 A1 | 7/2006 | Werner |
| 2006/0156315 A1 | 7/2006 | Wood et al. |
| 2006/0220904 A1 | 10/2006 | Jarlengrip |
| 2006/0250224 A1 | 11/2006 | Steffel et al. |
| 2006/0293813 A1 | 12/2006 | Nou |
| 2007/0027595 A1 | 2/2007 | Nou |
| 2007/0050854 A1 | 3/2007 | Cooperstein et al. |
| 2007/0072616 A1 | 3/2007 | Irani |
| 2007/0100514 A1 | 5/2007 | Park |
| 2007/0103339 A1 | 5/2007 | Maxwell et al. |
| 2007/0255568 A1 | 11/2007 | Pennock |
| 2008/0070616 A1 | 3/2008 | Yun |
| 2008/0109653 A1 | 5/2008 | Yokohama |
| 2008/0148374 A1 | 6/2008 | Spaur et al. |
| 2008/0150683 A1 | 6/2008 | Mikan et al. |
| 2008/0275604 A1 | 11/2008 | Perry et al. |
| 2009/0030605 A1 | 1/2009 | Breed |
| 2009/0045928 A1 | 2/2009 | Rao et al. |
| 2009/0096596 A1 | 4/2009 | Sultan et al. |
| 2009/0167524 A1 | 7/2009 | Chesnutt et al. |
| 2009/0184800 A1 | 7/2009 | Harris |
| 2009/0195370 A1 | 8/2009 | Huffman et al. |
| 2009/0243872 A1 * | 10/2009 | Takahashi ..................... 340/687 |
| 2009/0275281 A1 | 11/2009 | Rosen |
| 2009/0309709 A1 | 12/2009 | Bevacqua et al. |
| 2010/0004818 A1 | 1/2010 | Phelan |
| 2010/0007479 A1 | 1/2010 | Smith |
| 2010/0013596 A1 | 1/2010 | Kakiwaki |
| 2010/0030458 A1 | 2/2010 | Coughlin |
| 2010/0039224 A1 | 2/2010 | Okude et al. |
| 2010/0057586 A1 | 3/2010 | Chow |
| 2010/0075656 A1 | 3/2010 | Hawarter et al. |
| 2010/0097178 A1 | 4/2010 | Pisz et al. |
| 2010/0148923 A1 | 6/2010 | Takizawa |
| 2010/0178872 A1 | 7/2010 | Alrabady et al. |
| 2010/0191535 A1 | 7/2010 | Berry et al. |
| 2010/0191973 A1 | 7/2010 | Huntzicker et al. |
| 2010/0321203 A1 | 12/2010 | Tieman et al. |
| 2011/0009107 A1 | 1/2011 | Guba et al. |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0102146 A1 | 5/2011 | Giron |
| 2011/0105097 A1 | 5/2011 | Tadayon et al. |
| 2011/0106374 A1 | 5/2011 | Margol et al. |
| 2011/0112969 A1 | 5/2011 | Zaid et al. |
| 2011/0148574 A1 | 6/2011 | Simon et al. |
| 2011/0166748 A1 | 7/2011 | Schneider et al. |
| 2011/0213629 A1 | 9/2011 | Clark et al. |
| 2011/0215921 A1 | 9/2011 | Ben Ayed et al. |
| 2011/0275321 A1 | 11/2011 | Zhou et al. |
| 2011/0295444 A1 | 12/2011 | Westra et al. |
| 2012/0041633 A1 | 2/2012 | Schunder et al. |
| 2012/0054036 A1 | 3/2012 | Nam et al. |
| 2012/0071140 A1 | 3/2012 | Oesterling et al. |
| 2012/0139760 A1 | 6/2012 | Bevacqua et al. |
| 2012/0157069 A1 | 6/2012 | Elliott et al. |
| 2012/0280786 A1 | 11/2012 | Miller et al. |
| 2012/0284702 A1 | 11/2012 | Ganapathy et al. |
| 2012/0293317 A1 | 11/2012 | Hanna et al. |
| 2012/0313768 A1 | 12/2012 | Campbell et al. |
| 2013/0005302 A1 | 1/2013 | Ozaki |
| 2013/0151111 A1 * | 6/2013 | Skelton ........................... 701/99 |

(56) References Cited

U.S. PATENT DOCUMENTS

| | | |
|---|---|---|
| 2013/0162421 A1 | 6/2013 | Inaguma et al. |
| 2013/0200999 A1 | 8/2013 | Spodak et al. |

FOREIGN PATENT DOCUMENTS

| | | |
|---|---|---|
| DE | 102007046270 | 4/2009 |
| EP | 0449471 A2 | 10/1991 |
| EP | 0971463 A2 | 1/2000 |
| EP | 1095527 A1 | 5/2001 |
| JP | 2008195253 | 8/2008 |
| JP | 2008303630 | 12/2008 |
| WO | 0125572 | 4/2001 |
| WO | 2009158469 | 12/2009 |
| WO | 2012015403 | 2/2012 |

OTHER PUBLICATIONS

SALES@usasupremetech.com, In the U.S. a Car is Stolen Every 26 Seconds, The Wave of the Future, Biometrics Authentication, An Introduction.

Kermit Whitfield, "A hitchhiker's guide to the telematics ecosystem," Automotive Design & Production, Oct. 2003, http://findarticles.com, pp. 103.

Ford Motor Company, "SYNC," Owner's Guide Supplement, SYNC System Version 3 (Aug. 2009).

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

* cited by examiner

METHOD AND APPARATUS FOR TRACKING DEVICE CONNECTION AND STATE CHANGE

TECHNICAL FIELD

The illustrative embodiments generally relate to a method and apparatus for methods and apparatuses for tracking device connection and state change.

BACKGROUND

Vehicle infotainment and computing systems provide vehicle drivers with a variety of connection options and interactivity options. For example, a user could connect, via an interface, a USB device, a wireless device, etc.

Connectable devices can be used, among other things, to transfer data to and from a vehicle system, to control aspects of the vehicle system, and to otherwise interact with the vehicle computing system. When a vehicle owner connects a device, of course, it is done with the permission and at the will of the owner. Accordingly, accesses to vehicle systems made under such a scenario are typically not problematic. On the other hand, there are times, such as when a vehicle is valet parked, that an undesirable party can obtain access to a vehicle system through connecting an external device.

EP1095527 generally discusses a system for limiting access to certain components of a vehicle where the vehicle has a valet mode wherein access to the certain components of the vehicle is limited and a normal mode wherein the certain components are operable. The vehicle has a processor programmed to place the vehicle in the valet mode upon receipt of a first signal and to place the vehicle in the normal mode up receipt of a second signal. Mode changing signals are transmitted to a processor using a remote control and a connector switch removably connected to the remote control, wherein the remote control transmits the first signal when the connector switch is disconnected from the remote control, and wherein the remote control transmits the second signal when the connector switch is reconnected to the remote control. A radio in the vehicle and/or a voice-recognition system can also be used to transmit the mode changing signals to the processor.

EP0449471 generally discusses a system that interfaces between a variety of vehicle security systems and most cellular communication systems whether already sold and installed in vehicles or yet to be marketed. The system includes a system controller and an interfacing arrangement. The interfacing arrangement includes a first library, stored in memory, having a plurality of unique translation tables corresponding to the protocols of a plurality of unique cellular communication systems. The interfacing arrangement further includes an initializing capability for selecting an operating protocol for the interfacing system from the first library means which is compatible with the protocol of the cellular communication system.

SUMMARY

In a first illustrative embodiment, a system includes a processor configured to determine if a vehicle computing system (VCS) has been placed in a monitoring mode. The processor is also configured to detect and log the connection or disconnection of any remote devices. The processor is further configured to flag logs if the VCS is in a monitoring mode. Also, the processor is configured to detect the presence of a known vehicle driver or the termination of the monitoring mode and report any flagged logs upon known driver detection or monitoring mode termination.

In a second illustrative embodiment, a computer-implemented method includes determining if a vehicle computing system (VCS) has been placed in a monitoring mode. The method also includes detecting and loggin the connection or disconnection of any remote devices. Further, the method includes flagging logs if the VCS is in a monitoring mode. The method additionally includes detecting the presence of a known vehicle driver or the termination of the monitoring mode and reporting any flagged logs upon known driver detection or monitoring mode termination.

In a third illustrative embodiment, a non-transitory computer readable storage medium, stores instructions that, when executed by a processor, cause the processor to perform a method including determining if a vehicle computing system (VCS) has been placed in a monitoring mode. The method also includes detecting and loggin the connection or disconnection of any remote devices. Also, the method includes flagging logs if the VCS is in a monitoring mode. The method further includes detecting the presence of a known vehicle driver or the termination of the monitoring mode and reporting any flagged logs upon known driver detection or monitoring mode termination.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
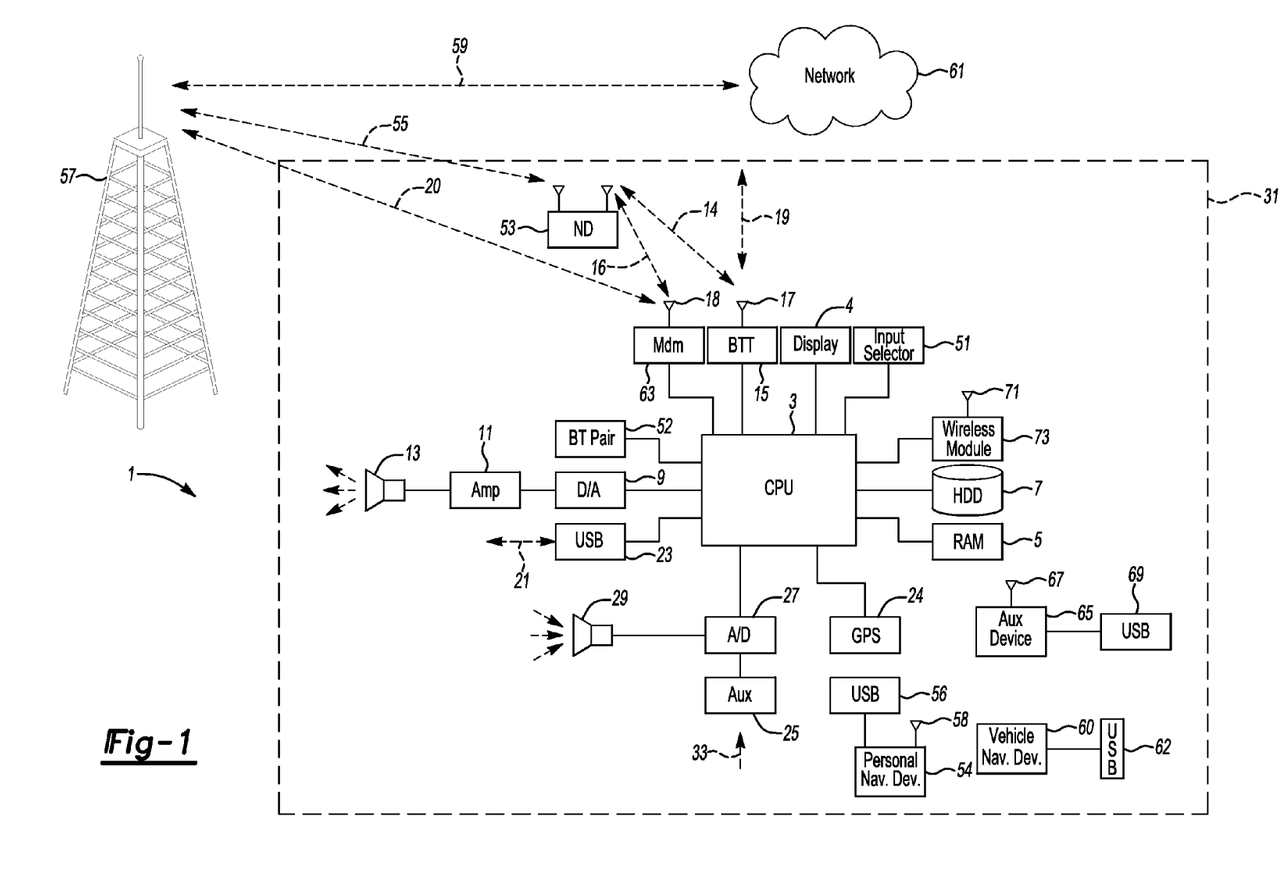
FIG. 1 shows an illustrative vehicle computing system

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device.

Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

When a vehicle is handed to a valet driver, any number of the objects in the vehicle are subject to possible theft or alteration. In a vehicle with a computing system, data stored on the system may also be similarly vulnerable. If, for example, a credit card number or bank account were stored, that information could be access by the valet.

In some instances, for example, a driver device may be connected to the system when the valet is handed the keys. The vehicle computing system may also be set to a valet mode, which can generally provide some form of enhanced security (limiting drive ranges, etc.). In the illustrative embodiments, the proposed systems can also track changes to devices connected or added to the system. For example, if a user's portable MP3 player were removed from connection, the system could track that the connected MP3 player was disconnected during the valet mode process.

Any changes in the "digital state" of the vehicle computing system can be tracked and reported to the user for ensuring that at least some devices and systems are secure during valet handling.

Figure 2:
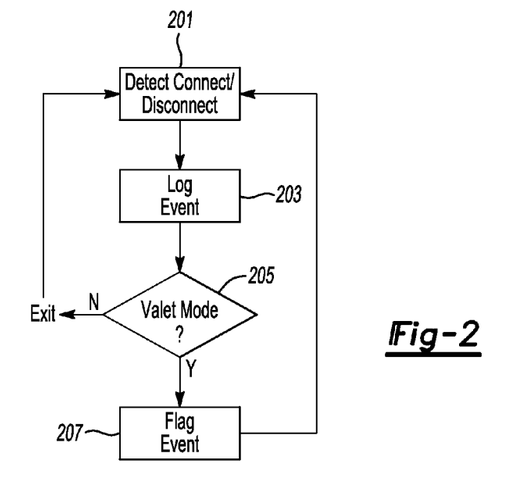
FIG. 2 shows an illustrative example of event tracking.

FIG. 2 shows an illustrative example of event tracking. In this illustrative example, a valet mode has been enabled on the VCS and, presumably, a valet has been given access to the vehicle. While the valet mode is enabled, and possibly just as a matter of general operation, the VCS detects the connection or disconnection of any connectable device 201. This can include, but is not limited to, a wireless phone, a tablet, a PC, mobile MP3 player, USB memory stick or any other digitally connectable device.

Whenever a device is connected or removed from connection with the VCS, the process will log the event 203. The log may be, for example, just a temporary recognition of the connection change which may be cleared, for example, when a vehicle is powered-down, or at some other temporary memory reset point (such as over-write). Since devices may be in constant connection/disconnection (a single driver making five trips in a day with a family of four could result in, for example twenty connections and disconnections), it may not be useful or reasonable to store (long term) the information relating to the tracking of these events.

On the other hand, information relating to these events may be desirable for driver perusal when these events occur when the driver is not in the vehicle. If, for example, the vehicle is in a valet mode or other monitoring mode 205, the process may flag the event 207. Flagging the event, for example, may cause the event record to be put in a protected state to avoid deletion. In other instances, it could cause the event to be stored in long-term memory, or otherwise preserved until the event can at least be reported to the driver.

Figure 3:
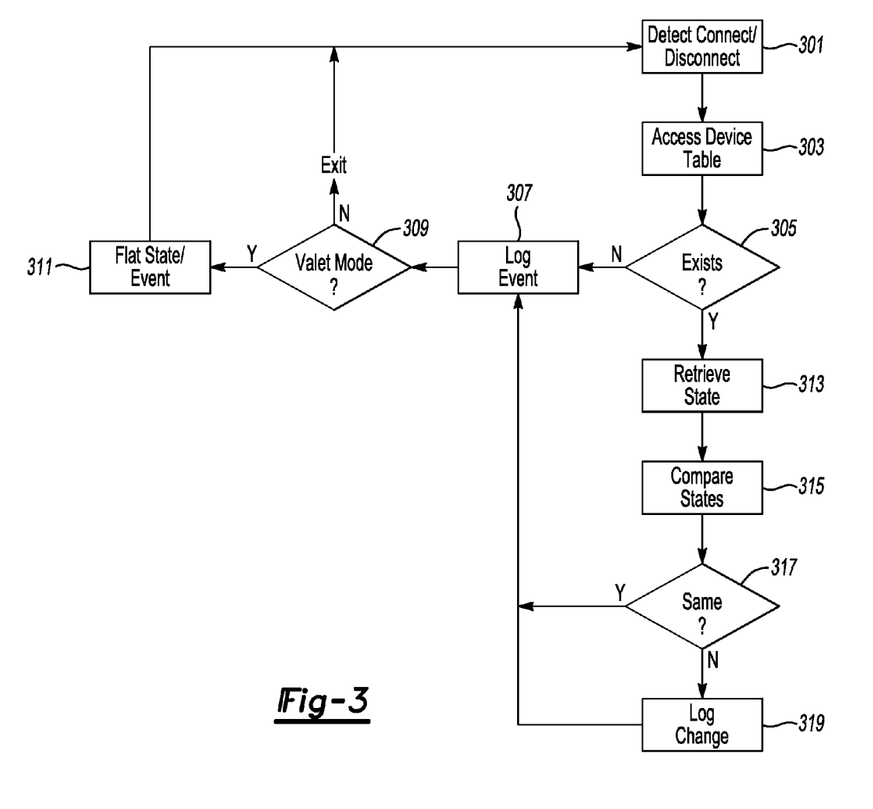
FIG. 3 shows an illustrative example of event and state tracking.

FIG. 3 shows an illustrative example of event and state tracking. In this illustrative example, the process is capable of both detecting attachment of new devices, as well as detecting state changes (e.g., disconnection, access) of previously or currently connected devices. Again, as with the previous process, this process detects if a device has been connected or disconnected 301. In addition, in this example, the process can detect if a connected device has a state change (e.g., access) or if a previously connected device is connected and experiences a state change. For example, a driver's phone could be connected to the system and then an application on the phone could be launched to access, for example, driver information stored on the VCS. The process could, in such a case, detect both the connection of the phone and the state change in the phone. In some cases, logs could also register various variable changes, specific access requests and other more specific information, depending on desirability and what permissions the VCS has.

For example, in the above instance where an attendant uses a driver's connected phone to access an address book, and then, for example, a bank account, the specifics of these access attempts (time, duration, etc.) could be logged for reporting. This could assist police in apprehending and convicting a criminal.

In this example, when a device is connected or a state is changed, the process access a device table 303. This is a table of previously and currently connected devices, maintaining some state information on these devices. The process checks to see if a connected device exists in the table 305. In some instances, for example, this table can be established when a valet mode is activated, as the process could take a snapshot of all connected devices.

If the device does not exist in the table, then the valet must have connected a new device, so there is a log made of the new device connection 307. On the other hand, if the device exists in the table, the process retrieves state information relating to that device from the table 313. The saved state information is compared to current device state information 315 to determine what, if anything, has changed. If there is no change in the states 317, the process proceeds to log any events (such as a connection of the device) 307. On the other hand, if there is a state change, the process logs the change 319 in state.

If the process detects a valet mode 309, then steps can be taken to preserve the information. If there is no setting to preserve the information, the process may discard the information if appropriate. If there is a setting indicating that information should be preserved, the process can flag the state or event 311, or take any other appropriate action.

Figure 4:
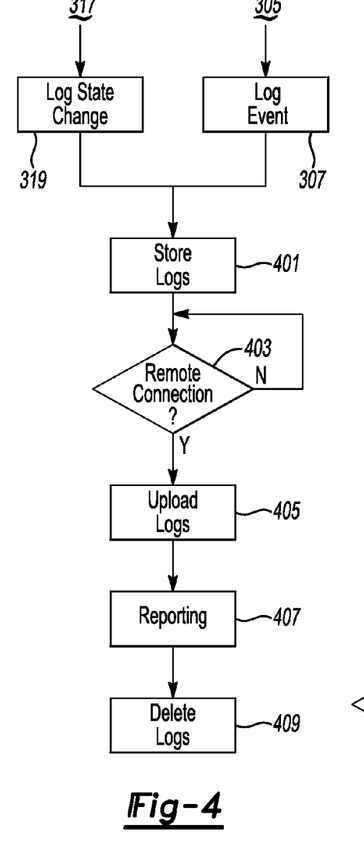
FIG. 4 shows an illustrative example of event and state reporting.

FIG. 4 shows an illustrative example of event and state reporting. As the vehicle collects device connection and removal, as well as possible state changes, if desired, such information can be usefully reported to the vehicle owner. For example, in this illustrative embodiment the process can log/flag some number of events and/or state changes 307, 319 as in FIG. 3. The flagged events can be stored locally 401 until useful reporting can be performed.

In this illustrative example, one form of reporting may include the uploading of events to a cloud-based storage. In this manner, records of events can be preserved for later access, without using up potentially limited vehicle memory. In this process, the system detects when a remote connection is present 403. The remote connection can be, for example, a connection to a remote server provided through use of a connected wireless device, such as a cellular phone.

Once the remote connection is present, the process can upload any saved logs 405. These logs can be stored with respect to a user ID or in other appropriate manner, to allow retrieval at a later point from the remote server. In addition to storing the logs remotely, the process may perform any appropriate reporting 407 (as discussed in FIG. 5) and then delete the logs to free up memory 409. The logs could also be saved locally for some time, if desired.

Figure 5:
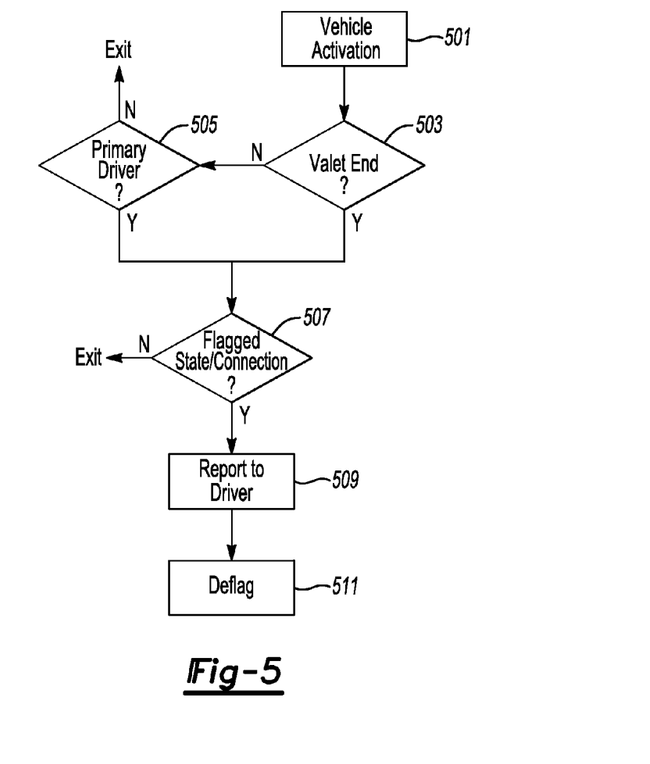
FIG. 5 shows an additional example of event and state reporting.

FIG. 5 shows an additional example of event and state reporting. In this illustrative example, saved events will be reported to a vehicle owner at some point after their occurrence. For example, in the instance of a valet, the owner will re-enter the vehicle at some point after the vehicle is returned to the owner. In this case, the process, upon vehicle activation, detects if an existing valet mode has ended 503.

When the valet mode ends, the process will engage in any appropriate reporting. Additionally or alternatively, the process may check to see if a known driver 505 is present before reporting any data. Although in this case, the reporting process begins determinations when a vehicle is started, other inception cases are also contemplated, such as the termination of the valet mode and/or the presence of a known driver.

Drivers can be "known" and recognized through a variety of techniques, including, but not limited to, recognition of a driver-carried device (e.g., phone) being connected to the system, facial recognition, and any other number of possible recognition processes.

Once the driver is recognized and/or valet mode is disabled, the process will check to see if there are any flagged state changes or connections to be reported 507. These correspond to events that occurred while the driver was out of the vehicle, and which were tracked by the vehicle. If there are one or more state changes or events to report, the process will report the events to the driver 509.

The event reports can come in any suitable form, including, but not limited to, audible, visual, notifications on a device or any other suitable manner. The driver may also be provided with an option to "save" one or more events, locally or through upload to a cloud. Once the events have been reported, the process may deflag 511 the events so that they can be deleted later when no longer needed.

The table below shows some exemplary instances of possible event occurrences during valet mode. It is provided for exemplary purposes only, and not to limited the invention in any manner. IGN, in the below table, stands for ignition.

| | Actions |
|---|---|
| Scenario 1 - No Changes | |
| User has device(s) connected and enables Enhanced Valet Mode. | |
| | Device logging begins, VCS takes snapshot of connected devices |
| | Query device table to capture connected USB Devices |
| IGN Off: Attendant parks vehicle | |
| | IGN Off Event Logged, incremented +1 |
| IGN On: Attendant retrieves and returns vehicle | |
| | IGN On Event Logged |
| VCS displays no change in device connectivity | |
| Scenario 2.0 - Owner Devices Removed During Valet Mode | |
| User has device(s) connected and enables Enhanced Valet Mode. | |
| | Device logging begins, VCS takes snapshot of connected devices |
| | Query device table to capture connected USB Devices |
| Attendant takes vehicle, removes connected USB device | |
| | Detach event logged and persisted - USB!HandleDetach: VID:PID 0000:0000 |
| VCS displays device <name> removal | |
| IGN Off: Attendant parks car | |
| | IGN Off Event Logged, incremented +1 |
| IGN On, Attendant retrieves and returns vehicle | |
| | IGN On Event Logged |
| Scenario 2.1 - Owner Devices Removed During Valet Mode | |
| User has device(s) connected and enables Enhanced Valet Mode. | |
| | Device logging begins, VCS takes snapshot of connected devices |
| | Query device.sqlite table to capture connected USB Devices |
| Attendant takes vehicle | |
| IGN Off: Attendant parks car | |
| | IGN Off Event Logged, incremented +1 |
| Attendant removes connected USB device | |
| | Detach event logged and persisted - USB!HandleDetach: VID:PID 0000:0000 |
| Attendant replaces connected USB device | |
| IGN On, Attendant retrieves and returns vehicle | |
| | IGN On Event Logged |
| VCS displays device <name> removal | |

-continued

| | Actions |
|---|---|
| Scenario 2.2 - Owner Devices Removed During Valet Mode | |
| User has device(s) connected and enables Enhanced Valet Mode. | |
| | Device logging begins, VCS takes snapshot of connected devices |
| | Query device table to capture connected USB Devices |
| Attendant takes vehicle | |
| IGN Off: Attendant parks car | |
| | IGN Off Event Logged, incremented +1 |
| Attendant removes connected USB device | |
| IGN On, Attendant retrieves and returns vehicle | |
| | IGN On Event Logged |
| | Device logging begins, VCS takes snapshot of connected devices |
| | Query device table to capture connected USB Devices |
| | Device mismatch compared to initial snapshot taken at Valet Mode activation. |
| VCS displays device <name> removal | |
| Scenario 3 - Attendant Inserts Foreign Device | |
| User has device(s) connected and enables Enhanced Valet Mode. | |
| | Device logging begins, VCS takes snapshot of connected devices |
| | Query device table to capture connected USB Devices |
| Attendant takes vehicle, inserts foreign USB device | |
| | "Attach" event logged and persisted - USB!HandleAttach: VID:PID 0000:0000 |
| | Device Information Logged and Stored in device table |
| IGN Off | |
| | IGN Off Event Logged, incremented +1 |
| IGN On, attendant retrieves and returns vehicle | |
| | IGN On Event Logged |
| | VCS displays device <name> inserted |
| | Additional Details of Device: |
| | Device Name |
| | Type of Device (i.e. iPod, USB, MTP) |
| | Duration of insert(?) |
| | Tracks played during valet mode |
| Driver reviews valet mode activity | |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
determine if a vehicle computing system (VCS) is in a monitoring mode;
detect and log any remote-device connection or disconnection;
flag the logs for upload;
detect a known driver or the monitoring-mode termination; and
report the flagged logs upon known driver detection or monitoring-mode termination, including remote-server connection detection and flagged log upload to the remote-server upon connection detection.

2. The system of claim 1, wherein the remote-device includes a portable phone.

3. The system of claim 1, wherein the remote device includes a USB memory device.

4. The system of claim 1, wherein the remote-device includes a personal computer.

5. The system of claim 1, wherein the remote-device includes a tablet.

6. The system of claim 1, wherein the remote-device includes a portable music player.

7. The system of claim 1, wherein the processor is further configured to detect and log a state change in any connected remote-device.

8. The system of claim 1, wherein the reporting is further performed over a vehicle audio system.

9. The system of claim 1, wherein the reporting is further performed over a vehicle visual display.

10. The system of claim 1, wherein the reporting is further performed to a user device.

11. The system of claim 1, wherein the processor is configured to provide the known driver with an option to save any flagged logs and to responsively save the flagged logs upon receipt of driver confirmation.

12. A computer-implemented method comprising:
   determining if a vehicle computing system (VCS) is in a monitoring-mode;
   detecting and logging any remote-device connection or disconnection;
   flagging the logs for upload;
   detecting a known driver or monitoring-mode termination; and
   reporting the flagged logs upon known driver detection or monitoring-mode termination, including detecting a remote-server connection and uploading the flagged log to the remote-server upon connection detection.

13. The method of claim 12, further comprising detecting and logging a state change in any connected remote device.

14. The method of claim 12, further comprising providing the known driver with an option to save any flagged logs and responsively saving the flagged logs upon receipt of driver confirmation.

15. A non-transitory computer readable storage medium, storing instructions that, when executed by a processor, cause the processor to perform a method comprising:
   determining if a vehicle computing system (VCS) is in a monitoring-mode;
   detecting and logging any remote device connection or disconnection;
   flagging the logs for upload;
   detecting a known driver or the monitoring-mode termination; and
   reporting the flagged logs upon known driver detection or monitoring-mode termination, including detecting a remote-server connection and uploading the flagged log to the remote-server upon connection detection.

16. The storage medium of claim 15, wherein the method further comprises detecting and logging a state change in any connected remote device.

17. The storage medium of claim 15, wherein the method further comprises providing the known driver with an option to save any flagged logs and responsively saving the flagged logs upon receipt of driver confirmation.

* * * * *